INVENTORS
MARVIN MASEL
HAROLD MOREINES
BY Chas. M. Funkhouser
ATTORNEY

INVENTORS
MARVIN MASEL
HAROLD MOREINES

United States Patent Office 3,008,078
Patented Nov. 7, 1961

3,008,078
AUTOPILOT SERVO LIMITER
Marvin Masel, Hackensack, and Harold Moreines, Hillside, N.J., assignors to The Bendix Corporation, a corporation of Delaware
Filed Nov. 18, 1957, Ser. No. 697,053
14 Claims. (Cl. 318—489)

The invention relates to servo control systems and, more particularly, to servo control systems limiting the force or torque output of a servo control system as a function of varying parameters.

In many aircraft autopilot installations, an electric servo operates a control surface of the craft in response to autopilot command signals. The maximum torque of the elevator servo is sometimes limited to some safe value to prevent excessive elevator deflections which may result in large normal accelerations with consequent structural damage to the aircraft or injury to crew and passengers. The maximum servo torque also must be within the overpowering capabilities of the pilot so that the pilot can assume manual control without disengaging the automatic pilot.

The overpowering requirement usually limits servo authority to forty or fifty pounds at the manual stick controller. To meet Civil Aeronautics Authority requirements, servo torque must be limited so that normal acceleration of the craft under any flight condition for which autopilot operation is licensed does not exceed an acceleration of 1 g, that is 32 ft./sec.$^2$. In high performance airplanes particularly, if the torque of the autopilot servomotor is limited for safety reasons to some flight condition where aircraft maneuver rate is high for unit force on the control surface, the available servomotor output will be inadequate to fly the aircraft properly for some other flight condition where aircraft maneuver rate is low for unit force on the control surface. For example, if a twenty pound stick force results in 1 g peak normal acceleration for one flight condition, this same twenty pound stick force may result in a peak normal acceleration of only .15 g under less favorable flight conditions. Large pitch oscillations may occur when the craft begins or finishes a turn at a substantial bank attitude while the craft is being flown by the automatic pilot.

One object of the invention is to vary the maximum torque of the servomotor so that the craft does not exceed a predetermined peak normal acceleration, but yet is capable of attaining the predetermined peak normal acceleration under any flight condition.

Another object is to limit the force exerted on the control surface of the craft as a function of craft acceleration or rate of change of attitude of the craft.

Another object is to limit autopilot authority of the craft as a function of craft acceleration or rate of change of craft attitude.

Another object of the invention is to limit the torque of a motor as a function of a variable parameter.

A further object is to provide a monitor for an automatic pilot using a torque limiting arrangement.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawing is for illustration purposes only and is not to be construed as defining the limits of the invention.

Figure 1:
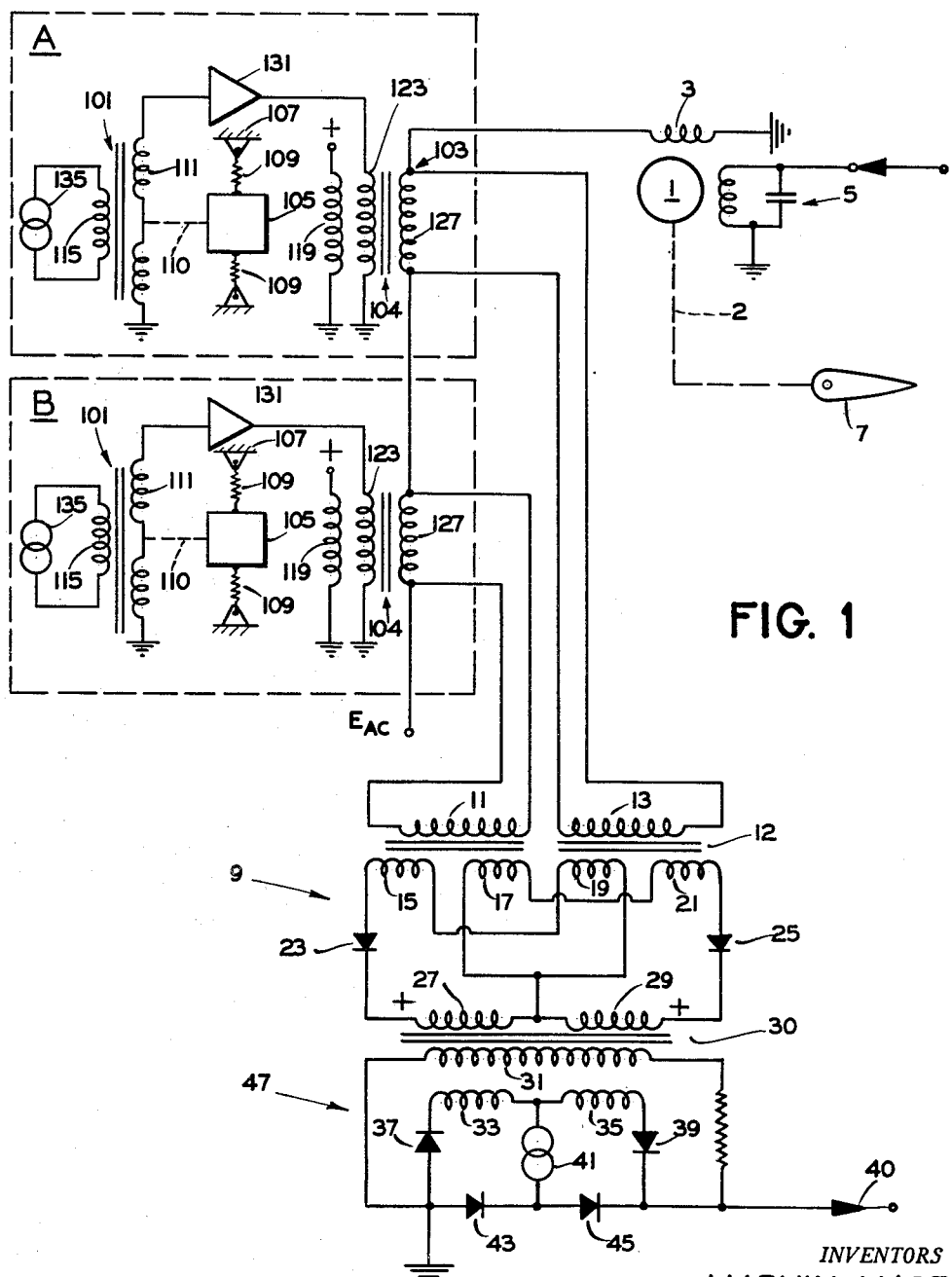
FIGURE 1 is a schematic diagram of a monitored torque or force limiting system constructed in accordance with the invention.

In FIGURE 1 a two phase motor 1 is drivably connected to a control surface 7 of a craft by a linkage 2. Autopilot command signals and follow-up are connected to variable phase winding 5 of motor 1 for controlling speed and direction of rotation of the motor. Fixed phase winding 3 is connected to a source of alternating current E A.C. by a pair of series connected accelerometers A and B. The voltage across fixed phase winding 3 is constant when the craft is not subjected to accelerations and the motor torque is controlled solely by the autopilot command signals and follow-up applied to the variable phase winding 5.

Accelerometers A and B will, however, vary the voltage in fixed phase winding 3 whenever the craft is subject to normal accelerations. Accelerometers A and B are identical in all respects to insure substantially equal operating characteristics.

Accelerometers A and B each comprise an inductive device 101 having a primary winding 115 energized by an alternating current source 135 which induces an alternating current in a secondary winding 111. The induced current is amplified and rectified by an amplifier rectifier 131 and then applied to a primary winding 123 on a core 104 of a saturable reactor 103. Core 104 of reactor 103 is biased to saturation by a bias winding 119 and the rectified current in primary winding 123 opposes the biasing current so that the core becomes less magnetized and increases the impedance of secondary winding 127 of reactor 103. Secondary winding 111 of inductive device 101 is connected by a linkage 110 to a mass 105 supported by springs 109 from a fixed support 107 for movement lengthwise of the springs. As the craft accelerates, secondary winding 111 is displaced linearly relative to primary winding 115 and the coupling factor between the windings 115 and 111 is increased resulting in an increased current in secondary winding 111 and an increase in the impedance of winding 127.

As the impedance of windings 127 increases the voltage across motor fixed phase winding 3 decreases so that the maximum motor torque decreases accordingly since the maximum motor torque is approximately proportional to the product of the voltages available across the motor windings 3 and 5.

A single accelerometer is capable of performing the function described above but two accelerometers are used to provide a monitor for safety purposes. Windings 127 of accelerometers A and B are each connected across one of a pair of primary windings 11 and 13 wound on a core 12 of a comparing circuit 9. Windings 11 and 13 are arranged so that the flux induced in the core 12 by the currents in windings 11 and 13 oppose. Primary windings 11 and 13 are inductively coupled to pairs of secondary windings 15, 17 and 19, 21 respectively. The windings are arranged so that the currents induced in windings 15 and 17 oppose the currents induced in windings 19 and 21. Windings 15 and 19 are connected together in series opposition with a rectifier 23 and a primary winding 27 wound on a core 30 of a magnetic switch 47 and windings 17 and 21 are connected together in series opposition with a rectifier 25 and primary winding 29 wound on core 30 of magnetic switch 47. Rectifiers 23 and 25 and windings 27 and 29 are arranged so that the flux induced in core 30 of magnetic switch 47 will add. With the arrangement described no current will flow in windings 27 and 29 as long as the voltages across windings 127 of accelerometers A and B are substantially equal because the currents induced in windings 15 and 19 cancel each other and the currents induced in windings 17 and 21 cancel each other.

Should a disparity exist between accelerometers A and B the impedance of windings 127 would no longer be substantially equal and the voltages applied to primary windings 11 and 13 would differ. This would produce currents in windings 27 and 29. Since these currents produce flux in the same direction, the core 30 of magnetic switch 47 would become saturated by this flux. Magnetic switch 47 has a pair of secondary windings 33 and 35 connected together and energized by a source of alternating current 41. Rectifiers 37, 39, 43 and 45 are connected to windings 33 and 35 and to source 41 to provide for alternate energization of windings 33 and 35. A feedback winding 31 is alternately connected in series with windings 33 and 35 and the output 40 of switch 47. Feedback winding 31 induces flux in the core 30 of switch 47 in a direction opposite to the flux induced in core 30 by windings 27 and 29 and when a current flows in windings 27 and 29 core 30 of switch 47 becomes unsaturated. This increases the impedance of windings 33 and 35 and reduces the voltage output of switch 47 at terminal 40.

When accelerometers A and B are in correspondence the voltages across windings 127 are substantially equal and no current flows in magnetic switch primary windings 27 and 29 and magnetic switch 47 produces via source 41 a constant output. Should the accelerometers fail to correspond, the voltages across windings 127 would not be equal and a current would flow in magnetic switch primary windings 27 and 29. This current would produce flux which would be opposed to the flux produced in feedback winding 31 and the core 30 of switch 47 would become unsaturated and the impedance of windings 33 and 35 would increase and reduce the switch output. The output of switch 47 may be used to control an alarm or hold the autopilot for fail safe operation as shown in FIGURE 2.

Figure 2:
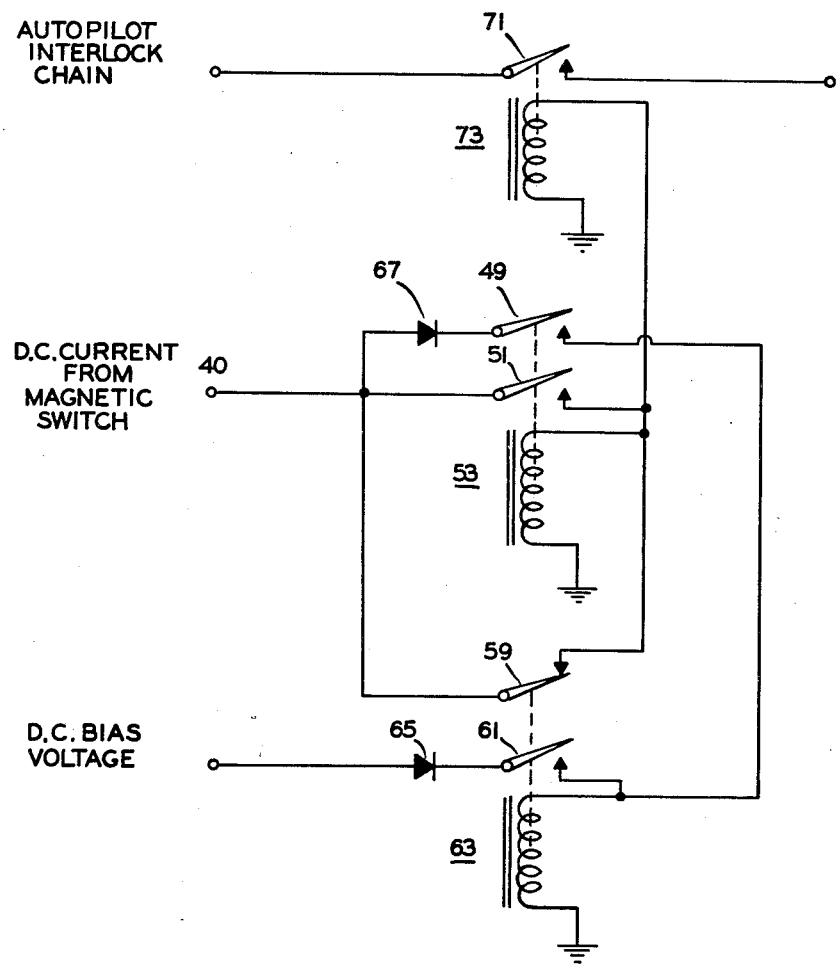
FIGURE 2 is a schematic diagram of an alarm, memory and interlock circuit for use with the torque or force limiting systems shown in FIGURES 1 and 3.

FIGURE 2 shows the alarm memory and interlock circuit before the autopilot is engaged. When the autopilot is engaged magnetic switch 47 is energized by source 41 as previously pointed out and contact 59 of relay 63 connects the output 40 of switch 47 to a relay 53 which closes contacts 51 and 49. Contact 51 provides an alternate connection between switch 47 and relay 53. Contact 49 connects relay 63 with the output 40 of switch 47 to open contact 59 and close a contact 61. Contact 61 connects relay 63 to a direct current bias voltage for latching relay 63 and holding contact 59 open. When contacts 51 or 59 are closed a third relay 73 is energized and closes a contact 71 which is in series with the autopilot interlock chain, not shown. A rectifier 67 between switch 49 and relay 53 and a rectifier 65 between switch 61 and the bias voltage source prevent bias voltage from operating relay 53.

During normal autopilot operation relays 53, 63 and 73 are energized. Should a malfunction occur in either accelerometer A or B and reduce the voltage output of magnetic switch 47, relays 53 and 73 would be deenergized and contacts 49, 51 and 71 would open, but since contact 59 is held open by relay 63 the alarm condition will persist even though the voltage output of switch 47 is restored by a correction of the malfunction or return to an unaccelerated condition. It is necessary that contacts 59 and 61 be restored to the position of FIGURE 2 before the alarm would be disconnected. This may be accomplished by manual means, not shown.

Figure 3:
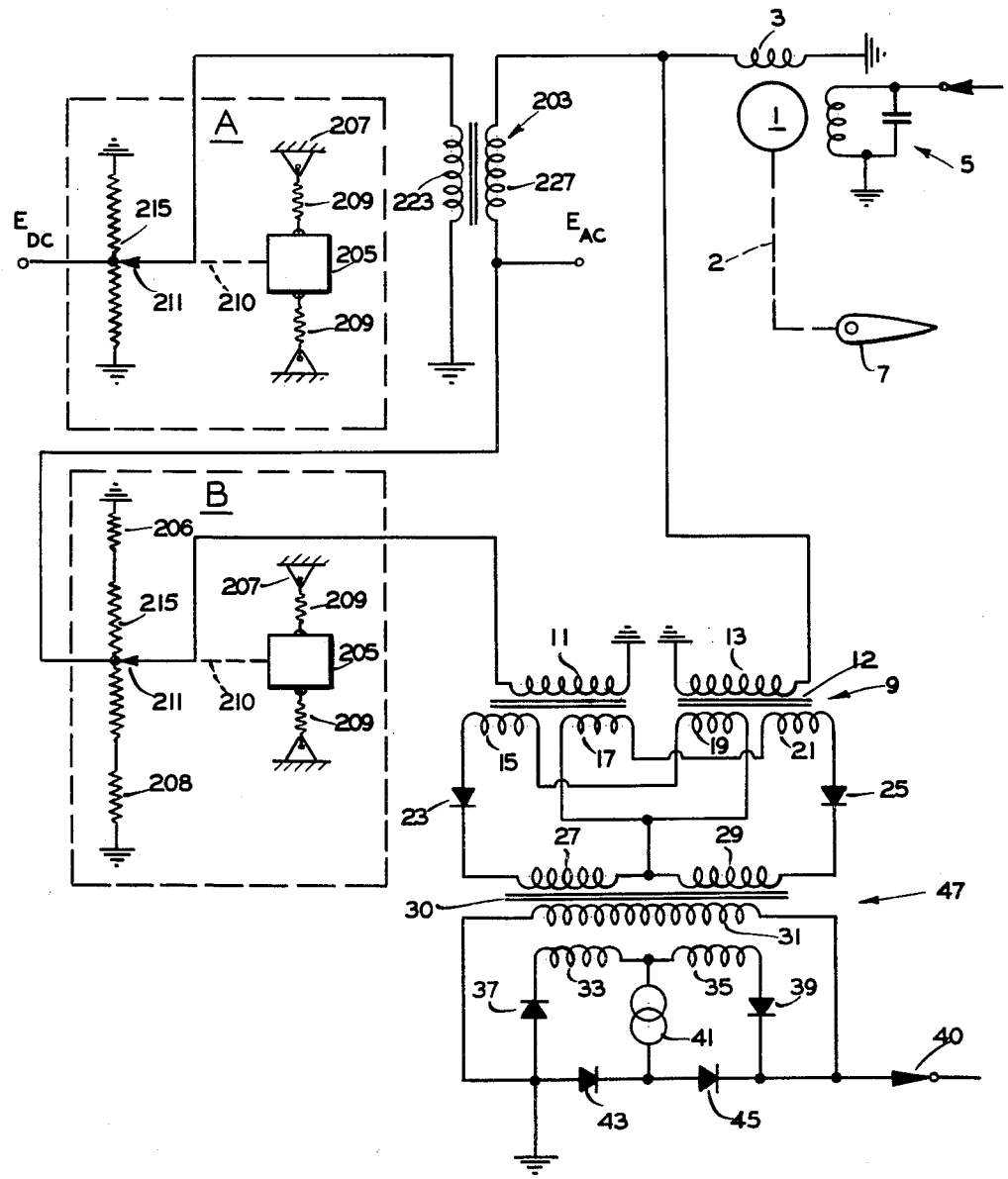
FIGURE 3 is a schematic diagram of another embodiment of a torque limiting system constructed in accordance with the invention.

The embodiment shown in FIGURE 3 is similar to that of FIGURE 1 except for the particular accelerometers used and their connections. A source of alternating voltage E A.C. for energizing the fixed phase winding 3 is connected to a secondary winding 227 of saturable reactor 203. Accelerometer A is energized by a direct current E D.C. applied to a centertap on a resistor 215 which is grounded at both ends. A slide wire 211 makes contact with resistor 215 at its center when the craft is not subject to acceleration. The current from E D.C. is applied via slide wire 211 to a primary winding 223 of reactor 203 and saturates the reactor core thus reducing the impedance of winding 227. When the craft is subject to accelerations slide wire 211 is displaced in the same manner as secondary winding 111 of FIGURE 1. As slide wire 211 is displaced, the voltage applied to primary winding 223 is decreased and the core of reactor 203 becomes unsaturated with a resultant rise in the impedance of winding 227 and a drop in the voltage applied to motor fixed phase winding 3. For monitoring purposes a similar accelerometer is also connected to source E A.C. and the voltage drop across secondary winding 227 and resistor 215 are compared in the same manner as in FIGURE 1. A pair of resistors 206 and 208 are connected to opposite ends of resistor 215 of accelerometer B and adjusted so that the minimum monitor voltage from accelerometer B corresponds to the minimum value of the fixed phase voltage. In other words, under these conditions the voltages across primary windings 11 and 13 of comparing circuit 9 are equal for corresponding movement of slide wire 211.

The novel control devices described provide an effective and reliable means for limiting the extent of the accelerations or attitude rates of a craft as a function of its actual acceleration or attitude rate by changing the voltage applied to the fixed phase winding of the control surface actuating motor and thereby limiting the authority of the command signal applied to the actuating motor.

Although two embodiments of the invention have been illustrated and described in detail, it is to be expressly understood that the invention is not limited thereto. As hereinbefore indicated, various changes may also be made in the design and arrangement of the parts without departing from the spirit and scope of the invention as the same will now be understood by those skilled in the art.

We claim:
1. In a control device for limiting normal acceleration of a craft, a motor having first and second windings for controlling the movement of said craft, said first winding being energized by a source of signal voltage in response to a condition for controlling the output of said motor, and said second winding being energized by another source of voltage for energizing said motor, and means responsive to accelerations of the craft for varying the voltage applied to said second winding to limit maximum torque of the motor.

2. In a control device for limiting normal acceleration of a craft about an axis, a motor having first and second stator windings for controlling the movement of said craft, said first winding being energized by a source of signal voltage in response to a condition for controlling the output of said motor, and said second winding being energized by another source of voltage for actuating said motor, and means responsive to accelerations of the craft about the axis for varying the voltage applied to said second winding to limit the maximum torque output of said motor irrespective of the signal applied to said first winding.

3. In a control device for limiting normal acceleration of a craft about an axis, a motor having first and second stator windings for controlling the movement of said craft, said first winding being energized by a source of signal voltage in response to a condition for controlling the output of said motor, and said second winding being energized by another source of voltage for actuating said motor, and means responsive to accelerations of the craft about the axis for varying the voltage applied to said second winding to limit the maximum acceleration of the craft irrespective of the signal applied to the first winding.

4. In a control device mounted on a craft subject to changes in attitude rate, a motor having first and second windings for controlling the movement of the craft, said first winding being energized by a source of signal voltage in response to a condition for controlling the output of the motor and said second winding being energized by another source of voltage for actuating said motor, and means responsive to changes in the attitude rate of the craft for varying the voltage applied to said second winding to limit the maximum output of the motor irrespective of the signal applied to the first winding.

5. A control device for limiting normal acceleration of a craft including a two phase motor for operating a control element of said craft, a source of signal voltage responsive to a condition connected to one phase of said motor and another source of voltage connected to the other phase, and an accelerometer for varying the voltage applied to said other phase as a function of craft acceleration to limit the output of said motor according to acceleration of the craft.

6. A control device for limiting normal acceleration of a craft about an axis, including a two phase motor for operating a control element of said craft, a source of signal voltage responsive to a condition connected to one phase of said motor and a source of voltage connected to the other phase, and an accelerometer for varying the voltage applied to said other phase as a function of craft acceleration about an axis to limit the output of said motor in accordance with the acceleration of the craft about the axis.

7. The device claimed in claim 6 wherein said accelerometer comprises a potentiometer having its mid-point connected to a source of D.C. potential, a slide wire engaging said potentiometer and positioned at said mid-point when the accelerometer is not subject to accelerations, a mass responsive to accelerations connected to said slide wire for moving said wire and a saturable reactor connected to said slide wire and said other phase for changing the impedance of said other phase.

8. The device claimed in claim 6 wherein said accelerometer comprises a transformer having inductively coupled windings movable relative to each other for varying the output therefrom, a source of alternating current for energizing one of said windings, a mass responsive to accelerations connected to the other of said windings for moving said other winding when said mass is subjected to accelerations and a saturable reactor connected to said movable winding and said other phase for changing the impedance of said other phase.

9. A control system for limiting normal acceleration of a craft comprising a torque motor for actuating a control element on said craft and having a pair of control windings, one of the windings being energized by a source of signal voltage in response to a condition, a pair of accelerometers for developing an output corresponding to the acceleration of the craft, monitoring means for the accelerometers connected to the accelerometers for providing signals when said accelerometers are not in correspondence, and means connecting the accelerometers and the other control winding for energizing the winding as a function of the accelerometer outputs.

10. In a control system for a craft including acceleration sensing means for limiting acceleration of the craft and having a pair of accelerometers each developing an output corresponding to the acceleration of the craft, a monitor for the acceleration sensing means comprising a comparison network connected to the accelerometers for detecting a disparity between the accelerometers, and warning means responsive to the comparison network and operated thereby.

11. A control system for a craft subject to accelerations, comprising a servomotor including a torque control element, two accelerometers each developing an output corresponding to craft acceleration and connected to the torque control element for regulating the maximum torque output of the motor, and a monitor for detecting a fault in the accelerometers including a comparison network connected to the accelerometers for providing an output when a disparity above a preset magnitude exists.

12. A control system for limiting the output of a motor, comprising a first motor winding energized by a variable source of signal voltage in response to a condition, a second motor winding energized by a source of fixed voltage, and means interposed between the second winding and the source of fixed voltage for varying the voltage applied to the second winding as a function of a variable parameter.

13. A control system for limiting the output of a multiphase motor having at least two phase windings, one of the windings being energized by variable command signals in response to changes in a condition, the other winding being energized from a source of alternating current voltage, and means for varying the alternating current voltage energizing the second winding as a function of a variable parameter to limit the maximum output of the motor.

14. In a control device mounted on a craft subject to accelerations, a motor having a pair of windings, an automatic pilot for operating the motor to control the attitude of the craft, one motor winding being energized by a variable source of signal voltage from the automatic pilot and the other motor winding being energized by a fixed source of voltage, a pair of accelerometers responsive to accelerations of the craft for varying the voltage applied to said other winding from the fixed source to vary the maximum torque output of the motor, and a monitor for detecting a fault in the accelerometers including a comparison network connected to the accelerometers, and switching means operable by the comparison network upon the occurrence of a fault in the accelerometers for rendering the automatic pilot ineffective to control the craft.

References Cited in the file of this patent

UNITED STATES PATENTS

| | | |
|---|---|---|
| 2,487,793 | Esval et al. | Nov. 15, 1949 |
| 2,488,286 | Glenny | Nov. 15, 1949 |
| 2,659,041 | Kutzler | Nov. 10, 1953 |
| 2,674,711 | MacCallum | Apr. 6, 1954 |
| 2,665,086 | Moog et al. | Jan. 5, 1954 |
| 2,759,689 | Owen | Aug. 21, 1956 |
| 2,770,429 | Schuck et al. | Nov. 13, 1956 |
| 2,770,452 | Miller | Nov. 13, 1956 |
| 2,823,877 | Hess | Feb. 18, 1958 |
| 2,866,933 | Bond et al. | Dec. 30, 1958 |

OTHER REFERENCES

"Aviation Week," vol. 57, Issue 25, December 22, 1952, pp. 35–38.